United States Patent
Hatasaki et al.

(10) Patent No.: US 9,075,527 B2
(45) Date of Patent: Jul. 7, 2015

(54) COMPUTER REALIZING HIGH-SPEED ACCESS AND DATA PROTECTION OF STORAGE DEVICE, COMPUTER SYSTEM, AND I/O REQUEST PROCESSING METHOD

(71) Applicant: HITACHI, LTD., Tokyo (JP)

(72) Inventors: Keisuke Hatasaki, Kawasaki (JP); Kazuhide Aikoh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/583,883

(22) Filed: Dec. 29, 2014

(65) Prior Publication Data

US 2015/0121004 A1 Apr. 30, 2015

Related U.S. Application Data

(63) Continuation of application No. 13/807,410, filed as application No. PCT/JP2012/007983 on Dec. 13, 2012, now Pat. No. 8,935,448.

(51) Int. Cl.
*G06F 13/00* (2006.01)
*G06F 3/06* (2006.01)
*G06F 13/10* (2006.01)

(52) U.S. Cl.
CPC .............. *G06F 3/061* (2013.01); *G06F 3/0689* (2013.01); *G06F 3/0665* (2013.01); *G06F 13/10* (2013.01); *G06F 3/067* (2013.01)

(58) Field of Classification Search
CPC ................................. G06F 13/10; G06F 3/067
See application file for complete search history.

(56) References Cited

U.S. PATENT DOCUMENTS

| 8,234,419 | B1 | 7/2012 | Nasu et al. |
| 2008/0086585 | A1 | 4/2008 | Fukuda et al. |
| 2011/0289267 | A1 | 11/2011 | Flynn et al. |
| 2012/0198174 | A1* | 8/2012 | Nellans et al. ................. 711/133 |

FOREIGN PATENT DOCUMENTS

JP 2008-97225 4/2008

* cited by examiner

*Primary Examiner* — Zachary K Huson
(74) *Attorney, Agent, or Firm* — Mattingly & Malur, PC

(57) ABSTRACT

In a computer, a logical partition for calculation in which an OS and an application operate and a logical partition for storage for providing a storage function are constructed. In the logical partition for calculation, a device corresponding to a storage device is provided, while the logical partition for storage provides a volume. A memory space that can be shared by the both logical partitions is prepared, and management information describing a sorting destination or a sorting method of an I/O request issued by an application is provided in the memory. If the logical partition for calculation receives an I/O request from the application, the partition refers to the management information and sorts the I/O request to the storage device or the logical partition for storage. The logical partition for storage processes the received I/O request by the storage function and transmits the result to the storage device.

20 Claims, 16 Drawing Sheets

Fig. 5

Device configuration table (131)

| Device identifier (501) | Can be shared or not (502) | Area identification information (503) |
|---|---|---|
| Storage device 1 | Enable | Raw |
| Storage device 2 | Enable | Raw |
| Storage device 3 | Disable | RAID |
| Storage device 4 | Disable | RAID |
| Storage device 5 | Disable | RAID |
| ... | ... | ... |

Fig. 6

RAID configuration table (132)

| Array group (601) | RAID level/configuration (602) | Device identifier (603) |
|---|---|---|
| AG1 | RAID1 | Storage devices 3, 4 |
| AG2 | RAID5(4D+1P) | Storage devices 5,6,7,8,9 |
| ... | ... | ... |

Fig. 7

Volume configuration table 126

| Volume 701 | Target 702 | Assigned host identifier 703 |
|---|---|---|
| VOL a | AG1 | APP LPAR1-a |
| VOL b | AG2 | APP LPAR1-b |
| VOL c | Storage device 1 | APP LPAR1-c |
| VOL d | Storage apparatus x | APP LPAR2-a, WWN1 |
| VOL z | VOL a mirror | None |
| ... | ... | ... |

Fig. 9

Virtual device configuration table 133

| Partition identifier | Virtual device | Multiple path | Mode | Transmission destination | RAID level/configuration |
|---|---|---|---|---|---|
| APP LPAR1 | A | None | First path | 1a | RAID1 |
| APP LPAR1 | B | Yes | Second path | 2b | RAID5(4D+1P) |
| APP LPAR1 | C | Yes | Second path | 2c | Raw |
| APP LPAR2 | A | Yes | First path | 1a | Raw |
| ... | ... | ... | ... | ... | ... |

COMPUTER REALIZING HIGH-SPEED ACCESS AND DATA PROTECTION OF STORAGE DEVICE, COMPUTER SYSTEM, AND I/O REQUEST PROCESSING METHOD

This is a continuation application of U.S. Ser. No. 13/807,410, filed Dec. 28, 2012. This application claims priority from National Stage of PCT/JP2012/007983, filed Dec. 13, 2012. The entire disclosures of all of the applications listed above are hereby incorporated by reference.

TECHNICAL FIELD

The present invention relates to a computer which realizes data protection while bringing out access performances of a storage device, a computer system, and an I/O request processing method.

BACKGROUND ART

In processing of transactions for important data, a storage system provided with high data protection functions is indispensable. On the other hand, in primary processing or search/analysis processing capable of retry processing, high speed is given emphasis in some cases.

At present, high-speed devices to be mounted on servers and storages including products such as PCIe-SSD, which couples an SSD (Solid State Drive) with a high-speed protocol such as PCIe (PCI Express), and products such as All Flash Storage on which only an SSD is mounted, have appeared.

CITATION LIST

Patent Literature

[PTL 1] Japanese Patent Laid-Open No. 2008-97225
[PTL 2] U.S. Patent No. 2011/0289267

SUMMARY OF INVENTION

Technical Problem

As described in PTL 1, a high-performance storage system utilizing the respective characteristics of both a low-speed device such as an HDD (Hard Disk Drive) and a high-speed device such as an SSD has been proposed. However, in this case, a storage controller makes a bottleneck and there is a problem that the performances of the high-speed device such as the SSD cannot be fully brought out. On the other hand, by directly coupling a high-speed device to a server, the performance can be brought out without going through the storage controller, but there is a problem that storage functions such as a data protection function provided in the storage controller cannot be fully utilized.

Moreover, as in PTL 2, in order to improve a Read performance of an application by utilizing a high-speed device, there is a method in which the high-speed device is directly coupled to the server, the high-speed device is used for a cache application, and the Write from the application is handled by writing data via write-through in the storage device coupled to an external device so as to realize both the high-speed access and data protection, but it is not necessary to protect data of all the write data and there is a problem that the Write performance cannot be fully brought out.

The present invention has an object to provide data access means which can bring out both functionality of a storage controller and an I/O performance of a storage device in data access to the storage device.

Solution to Problem

In the present invention, in order to solve at least one of the above-described problems, a computer is logically partitioned, and a logical partition for compute and a logical partition for storage are prepared. Regarding I/O from the compute partition, it is determined whether the logical partition for storage is passed or not in accordance with I/O contents, the I/O is sorted, and an access is made to a storage device group.

Moreover, in the present invention, in order to solve at least one of the above-described problems, a computer for compute and a computer for storage are prepared, and regarding I/O from the computer for compute, it is determined whether the computer for storage is passed or not in accordance with I/O contents, the I/O is sorted, and an access is made to a storage device group.

Advantageous Effects of Invention

According to the present invention, a computer capable of flexible use according to user needs for a case where a high-speed access to a storage device is needed and for a case where data is to be protected can be provided.

BRIEF DESCRIPTION OF DRAWINGS

FIG. 5 is a diagram illustrating a configuration example of a device configuration table in Embodiment 1.

FIG. 6 is a diagram illustrating a configuration example of a RAID configuration table in Embodiment 1.

FIG. 7 is a diagram illustrating a configuration example of a volume configuration table in Embodiment 1.

FIG. 9 is a diagram illustrating a configuration example of a virtual device configuration table in Embodiment 1.

DESCRIPTION OF EMBODIMENTS

Figure 1:
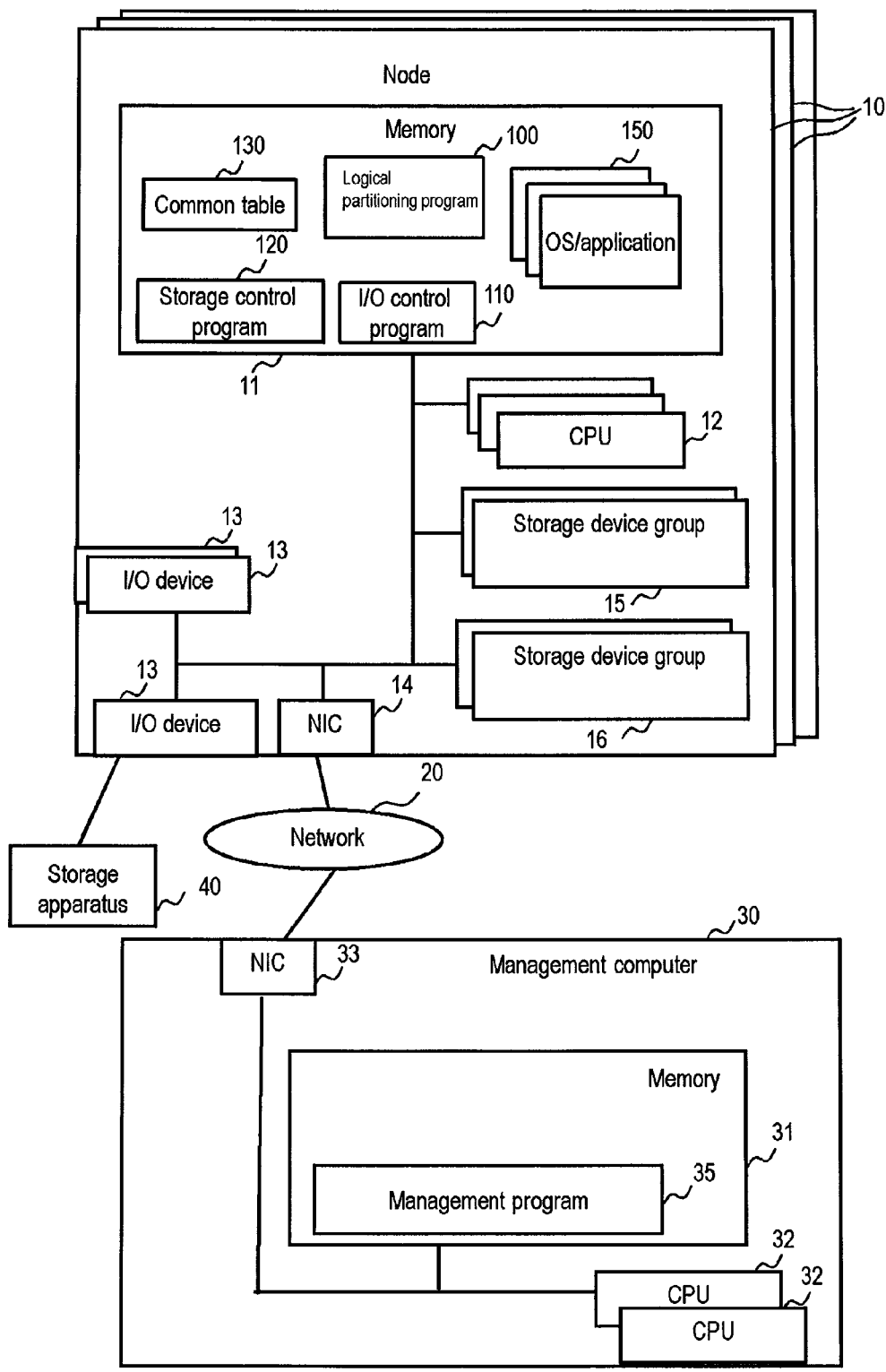
FIG. 1 is a block diagram for explaining a configuration example of a computer system in Embodiment 1.

Embodiments of the present invention will be described below by using the drawings.

In the following embodiments, since portions having the same structural parts and given the same reference numerals perform the same operations in principle, duplicated explanation is omitted.

Embodiment 1

A first embodiment of the present invention will be described below by referring to FIGS. 1 to 18. The embodiments are only an example for realizing the present invention and care should be taken that they do not limit a technical scope of the present invention.

FIG. 1 is a block diagram illustrating a configuration example of a computer system in this embodiment. The computer system in this embodiment is provided with one or more nodes 10. The node 10 is provided with one or more memories 11, a CPU (Central Processing Unit) 12, an I/O (Input/Output) device 13, an NIC (Network Interface Card) 14, and storage device groups 15 and 16 in the node 10. Here, the storage device groups 15 and 16 are groups of a plurality of storage devices. Moreover, the storage device groups 15 and 16 are different in type. For example, one of them is a Hard Disk Drive (HDD), while the other is a Solid State Drive (SSD) or the like. Moreover, the I/O device 13 is any one of an HBA (Host Bus Adaptor), a CNA (Converged Network Adapter), an HCA (Host Channel Adaptor), a PCIe extender and the like. In this embodiment, as a preferred embodiment of the invention, a form in which two types of devices, that is, a high-speed device and a low-speed device are coupled to the node 10, but the number of types of the device is not limited to 2 but may be 1 type or three types or more.

The memory 11 of the node 10 is provided with a logical partitioning program 100, an I/O control program 110, a storage control program 120, a shared table 130, and one or more OS (Operation System)/applications 150. The logical partitioning program 100 constructs one or more logical partitions on the node, and the OS can be operated independently in each logical partition. The I/O control program 110 controls an I/O request from the OS/application 150. The storage control program 120 provides functions including a management function of the storage device groups 15 and 16, a shared storage function of receiving and responding to a storage I/O from inside the node or from outside the node, a function of data protection, data copying and the like. The shared table 130 holds information to be shared by the I/O control program 110 and the storage control program 120. That is, the memory 11 comprises a shared portion including the shared table 130, a portion for compute partition, and a portion for storage partition.

Moreover, the computer system is provided with a network 20, a management computer 30, a memory 31 of the management computer 30, a CPU 32, an NIC 33, and a management program 35. The management computer 30 and the network 20 are not indispensable, and the management program 35 may be provided in one of the nodes 10 so that the entire computer system is managed, for example.

The management program 35 manages the entirety of this computer system. The management computer 30 can obtain necessary information from the node 10 and can control the node 10 via the network 20.

Moreover, a storage apparatus 40 is coupled to the node 10. Here, the storage apparatus 40 is a shared storage apparatus such as a SAN (Storage Area Network) storage apparatus 40 or the like. The storage apparatus 40 is not indispensable. In this embodiment, the storage apparatus 40 is used as equipment including various storage functions by using the storage device as a storage medium.

Figure 2:
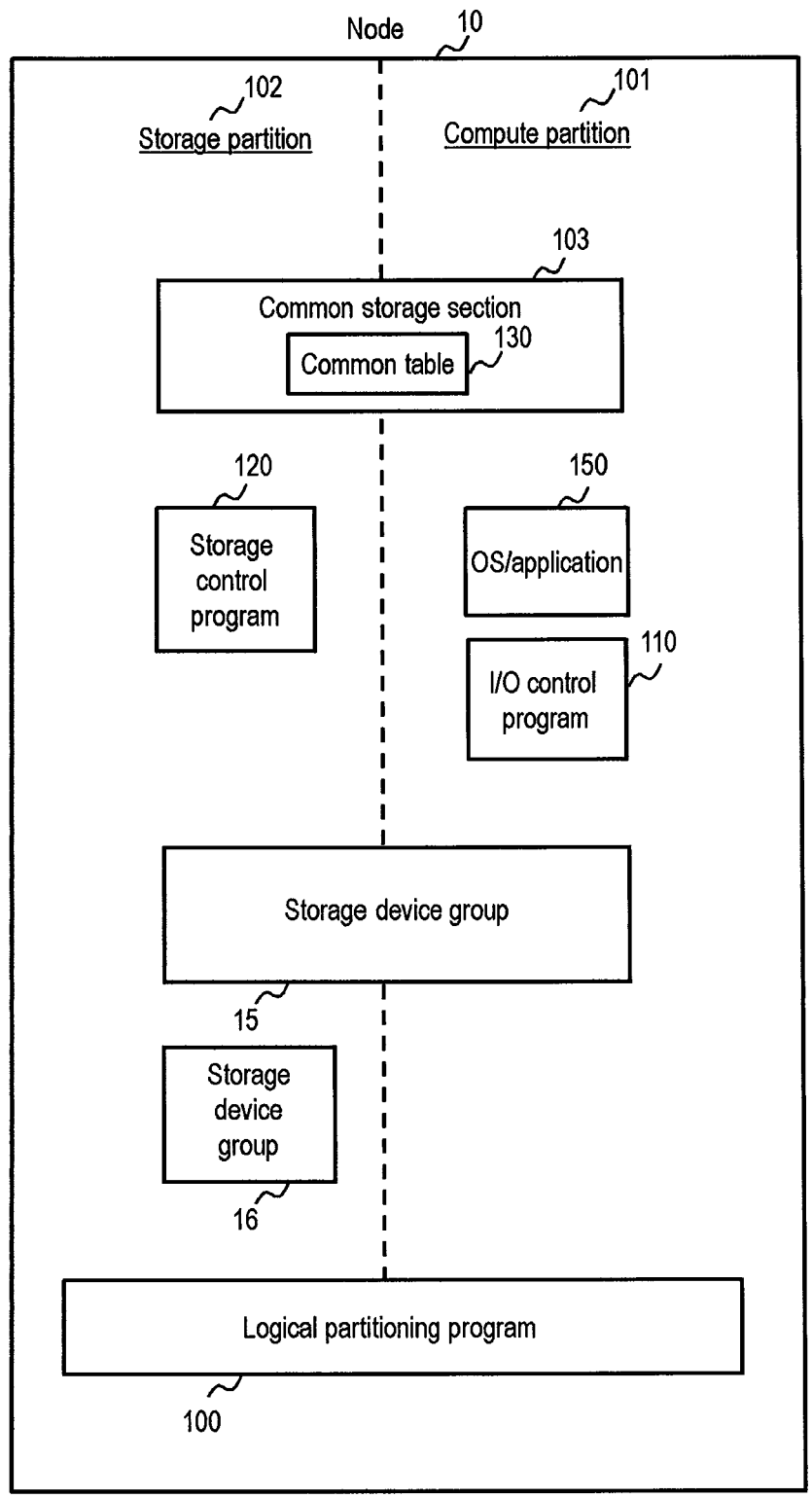
FIG. 2 is a diagram schematically illustrating a logical configuration example of a node in Embodiment 1.

FIG. 2 illustrates a logical configuration example of the node 10. In this embodiment, in the node 10, a compute partition 101 and a storage partition 102 as logical partitions are constructed by the logical partitioning program 100. Here, the logical partitioning program 100 can logically partition hardware resources such as the CPU 12, the memory 11, the I/O device 13, the storage device groups 15 and 16 provided in the node 10 and assign them to each logical partition. As an assignment method, a specific hardware resource is given priority and is assigned to a specific logical partition so as to guarantee a performance of the resource or to limit a range affected by a failure. Moreover, the hardware resource can be also shared, and that is realized by assigning a specific physical hardware resource to a plurality of logical partitions in shared.

In this embodiment, in the compute partition 101, the I/O control program 110 and the OS/application 150 are held on the memory 11 and are executed by the CPU 12. In the storage partition 102, the storage control program 120 is held on the memory 11 and is executed by the CPU 12. To the storage partition 102, the storage device group 16 is assigned. Moreover, a shared storage section 103 and the storage device group 15 are assigned to and shared by both the compute partition 101 and the storage partition 102. The shared storage section 103, here, is a part of the memory 11 on the node 10 and holds the shared table 130. In this embodiment, the I/O control program 110 is present in the compute partition 101, but the I/O control program 110 may be a part of the logical partitioning program 100.

Figure 3:
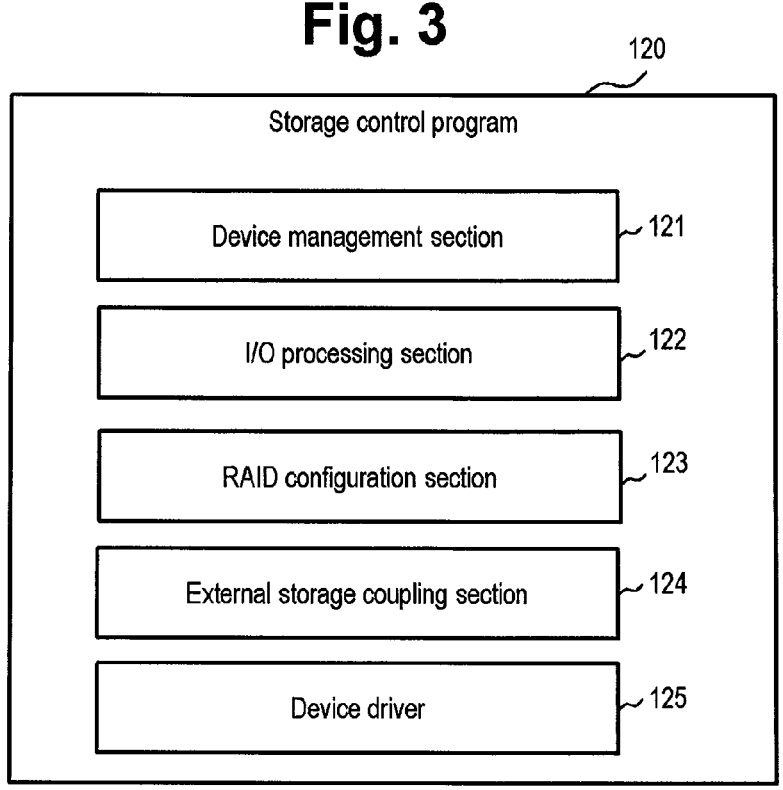
FIG. 3 is a diagram illustrating a configuration example of a storage control program in Embodiment 1.

FIG. 3 illustrates a block diagram of the storage control program 120 of this embodiment.

A device management module 121 manages a device configuration and a RAID (Redundant Array Inexpensive Disk) configuration of the storage device groups 15 and 16 assigned to the storage partition 102. The management of the device configuration, here, means management of whether or not the storage device can be shared by the storage partition 102 and the compute partition 101, the storage device is used in the RAID configuration or used as a device capable of direct access (hereinafter referred to as a Raw access), and this management information is held in the device configuration table 131. Moreover, the device management module 121 can instruct the logical partitioning program 100 to change assignment of the storage device to the logical partition. Moreover, the management of the RAID configuration means that the RAID level and the configuration of the storage device are managed, and this management information is held in a RAID configuration table 132. The device management module 121 is provided with a management GUI (Graphical User Interface) and an API (Application Programming Interface).

The I/O processing module 122 executes cache control to an I/O request from a host, an I/O access I/O request to a RAID configuration module 123 and an External storage connecting module 124, and a response to a host. Moreover, the I/O processing 122 is provided with functions specific to a storage apparatus such as copying, snapshot, backup, mirroring, tiering and the like. The host, here, is the compute partition 101 in the node 10 or another node or server outside the node 10 provided with the storage control program.

The RAID configuration module 123 executes conversion processing of an I/O request to a logical block address and a physical block address and executes the I/O request to the storage device.

The External storage connecting module 124 comprises a logical volume corresponding to the storage device and the storage apparatus 40 in order to make a Raw access to the storage device and the storage apparatus 40 and executes the I/O request to the storage device and the storage apparatus 40.

The device driver 125 includes a driver of the storage device, a driver for coupling to the compute partition 101, and a driver of the I/O device 13.

Figure 4:
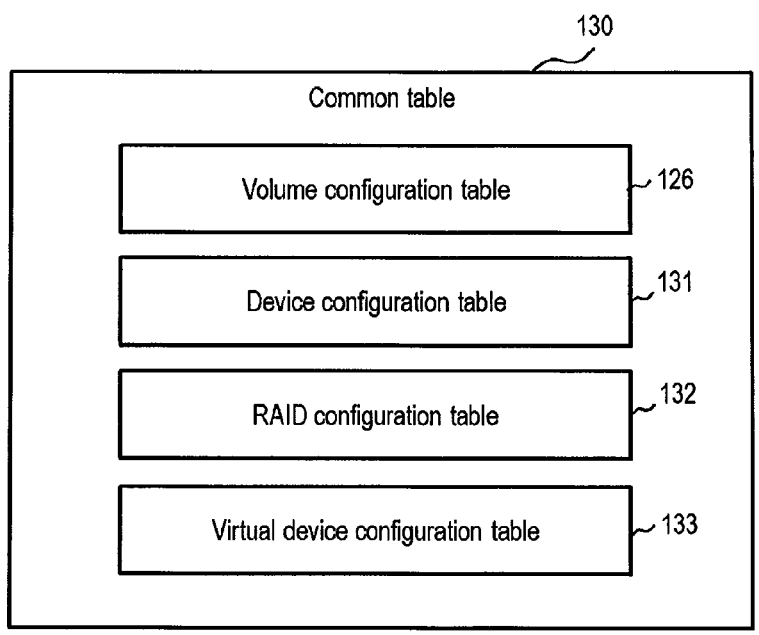
FIG. 4 is a diagram illustrating a configuration example of a shared table in Embodiment 1.

FIG. 4 illustrates a block diagram of the shared table 130 of this embodiment. A volume configuration table 126, a device configuration table 131, a RAID configuration table 132, and a virtual device configuration table 133 will be described in detail in FIGS. 7, 5, 6 and 9, respectively.

FIG. 5 illustrates the device configuration table 131 of this embodiment. A column 501 holds an identifier 501 of the storage device. The storage device, here, is a unit obtained by logically partitioning a PCI-SSD board by SSD unit, PCI-SSD board unit and SR-IOV (Single Root I/O Virtualization) and the like. As the storage device identifier, a number of a Bus, a Device, a Function of the PCI of the applicable device or the like is used. A specific identifier may be given and used as a storage device identifier if it is capable of identification.

A column 502 holds whether the storage device can be shared by the storage partition 102 and the compute partition 101 or not. This information is held or obtained by API on the basis of the specification of the storage device. A column 503 identifies whether the storage device is used in the RAID configuration or in Raw access. If "RAID" is entered here, it is used in the RAID configuration, and if "Raw" is entered, it is used in the Raw access. This table 131 may be created by the storage control program 120, the I/O control program 110 or the management program 35 or may be stored in advance.

FIG. 6 illustrates the RAID configuration table 132 in this embodiment. A column 601 holds an identifier of an array group. The column 601 holds a RAID level (information such as RAID0,1,5,6 and the like) of the array group and a data drive number n and a parity drive number m as "nD+mP" as the RAID configuration. A column 603 indicates an identifier of the storage device belonging to the array group. This storage device identifier corresponds to the column 501 of the device configuration table 131. This table 132 may be created by the storage control program 120, the I/O control program 110 or the management program 35 or may be stored in advance.

FIG. 7 illustrates the volume configuration table 126 in this embodiment. A column 701 holds an identifier of a volume. A column 702 holds a storage device corresponding to the volume. Here, in the case of the RAID-configured storage device, "AG1" or the like is described as an identifier of an array group. In the case of the storage device with Raw access, "storage device 1" or the like is described as an identifier of the storage device. In the case of the storage apparatus 40 which is a Raw-access storage outside the node, "storage apparatus x" or the like is described. Moreover, if a mirror volume having the same contents as a specific volume is logically comprised, "VOL a mirror" or the like is described for the mirror of the volume "VOL a", for example.

A column 703 holds an identifier of a host at an assignment destination. The assignment, here, indicates that the volume is accessible from the host. Here, the compute partition 101 in the node is described as, for example, by combining identification information such as an identifier of a logical partition at an assignment destination as "APP LPAR1" and an identifier of a logical volume to the logical partition (LUN (Logical Unit number) and the like, for example) as a, b, c . . . , "APP LPAR1-a" or the like. Moreover, in the case of a host outside the node, an identifier of a WWN or SCSI Name is held. Furthermore, if there is no assignment destination, "none" is described. This table 126 may be created by the storage control program 120, the I/O control program 110 or the management program 35 or may be stored in advance.

Figure 8:
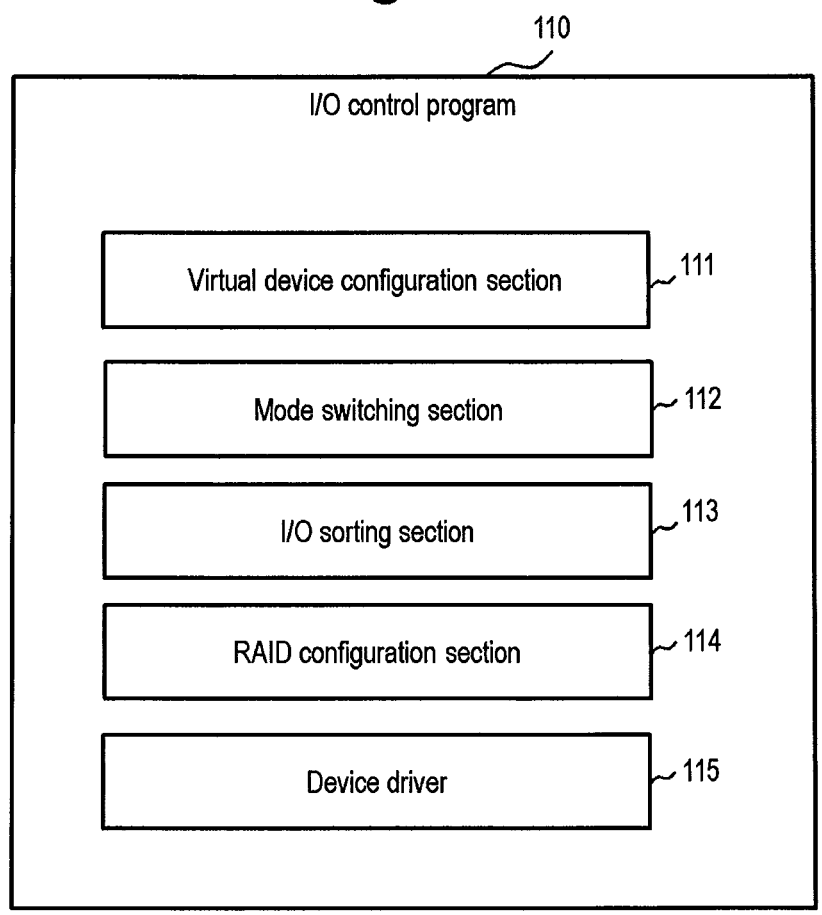
FIG. 8 is a diagram illustrating a configuration example of an I/O control program in Embodiment 1.

FIG. 8 illustrates a block diagram of the I/O control program 110 of this embodiment.

A virtual device configuration module 111 comprises a virtual device as a block device accessed from the OS/Application 150. A detailed flow will be described in FIG. 11.

A mode switching module 112 is provided with a function of switching a path of the I/O access from the OS/application 150 to the storage.

An I/O sorting module 113 is provided with a function of sorting the I/O access to the storage by mode. The detailed flow will be described in FIG. 12.

A RAID configuration module 114 executes conversion processing of the I/O request to the logical block address and the physical block address and executes the I/O request to the storage device.

A device driver 115 is a driver of the storage device, a driver to be coupled to the storage partition 102, and a driver of the storage I/O.

FIG. 9 illustrates the virtual device configuration table 133 in this embodiment. A column 901 holds an identifier of a logical partition of the compute partition 101 in the node as an identifier. A column 902 indicates an identifier of a target virtual device in the logical partition. This identifier is an identifier of the virtual device configured by the virtual device configuration module 111 of the I/O control program 110. If there are a plurality of them, they are enumerated with ",". A column 903 holds whether the virtual device includes a plurality of paths or not. In this embodiment, if they are included it is described as "Yes" and if they are not, it is described as "None". A column 904 indicates a mode of the virtual device.

Here, a "first path" indicates a case where a path of accessing a storage device via the storage control program 120 of the storage partition 102 is used as an I/O access path to the device. A "second path" indicates a case where the storage device is directly accessed from the compute partition 101. If the first path is used, here, the data protection function and the data control function and the like provided in the storage control program 120 can be used. On the other hand, if the second path is used, the storage control program 120 is bypassed and the storage device is directly accessed, whereby the performance of the storage device can be effectively exerted.

Moreover, the column 905 holds the identifier of the device connected through the path in the column 904 as an I/O access destination. For example, since the column 904 for an I/O of a virtual device B is the second path, the transmission destination 905 has a device identified as 2b.

A column 906 holds a RAID level and a configuration of the virtual device. If "Raw" is entered, it is not a RAID configured device. If a device with RAID configured is a target, the RAID level and the configuration are described as "RAID5(4D+1P)" or the like. This is equal to the column 602 of the RAID configuration table 132.

Figure 10:
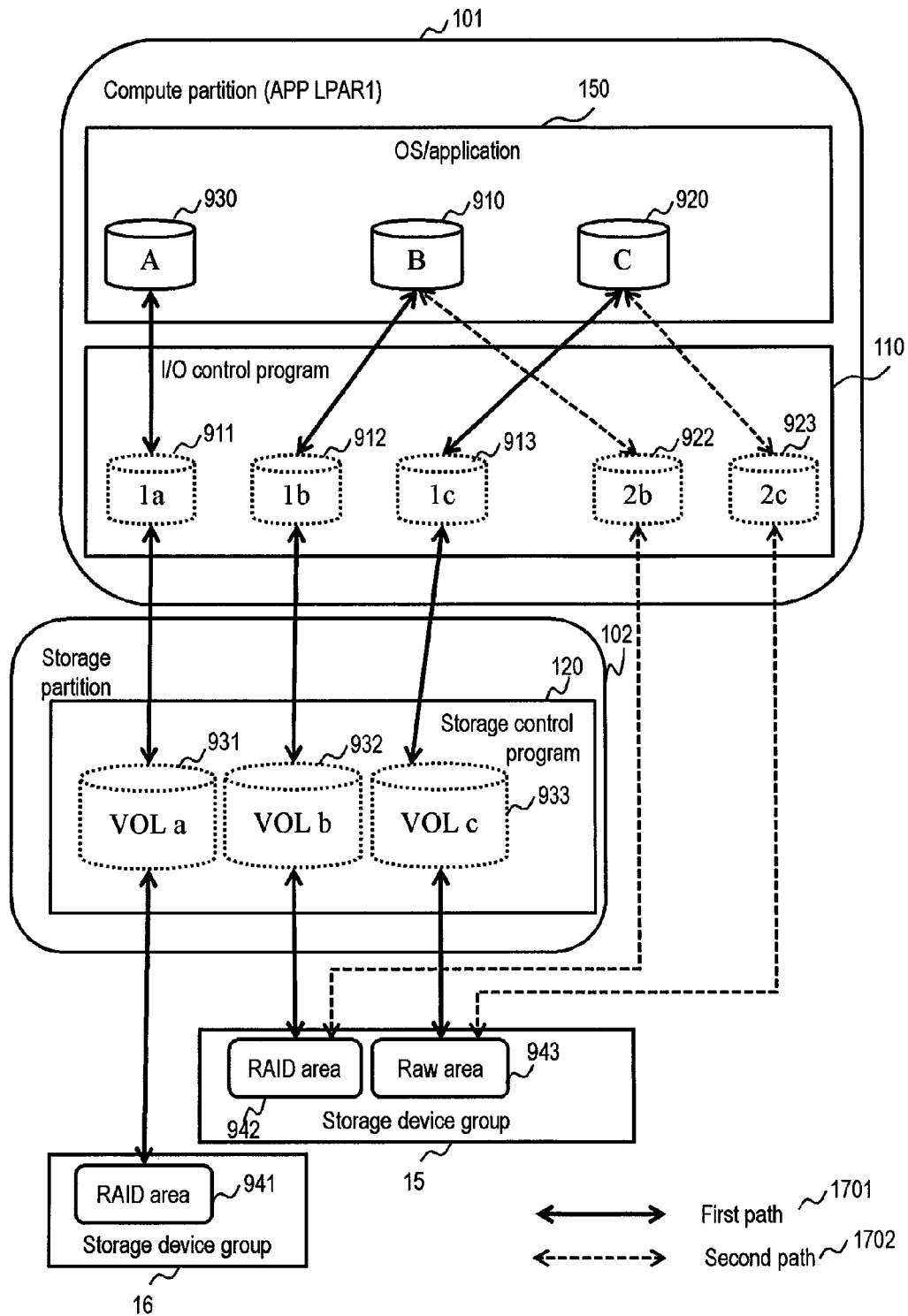
FIG. 10 is a diagram schematically illustrating a logical configuration example of a storage in Embodiment 1.

FIG. 10 illustrates a logical configuration of a storage of this embodiment. The storage device group 15 includes a RAID area 942 as a set of storage devices in each of which RAID is configured and a Raw area 943 as a set of storage devices capable of a direct access. The storage device group 16 also includes a RAID area 941. The RAID areas 941 and 942 and the Raw area 943 are made to correspond to volumes 931, 932, and 933, respectively, by the storage control program 120 of the storage partition 102. Moreover, the volumes 931, 932, and 933 are made to correspond to devices 911, 912, and 913 recognized by the I/O control program 110 of the compute partition 101, respectively. Moreover, the RAID area 942 and the Raw area 943 are made to correspond to devices 922 and 923 of the compute partition 101. Here, the RAID area 942 and the device 922 may be a plurality of storage devices.

A virtual device 910 which the I/O control program configures and shows to the OS/application 150 corresponds to the devices 912 and 922, the virtual device 920 corresponds to the devices 913 and 923, and the virtual device 930 corresponds to the device 911. Here, even if the device 922 includes a plurality of devices, it is converted to the single virtual device 910 by the RAID configuration module 114 of the I/O control program 110. The virtual devices 910 and 920 are provided with I/O access paths by a first path 1701 and a second path 1702, and in the first path, the I/O control program 110 executes the I/O access corresponding to the devices 912 and 913, respectively, while in the second path, the I/O access corresponding to the devices 922 and 923 is executed, respectively.

Though not shown, regarding the I/O access from the device 922 to the Raid area 942, the RAID control is executed through the RAID configuration section operating on the compute partition 101.

Figure 11:
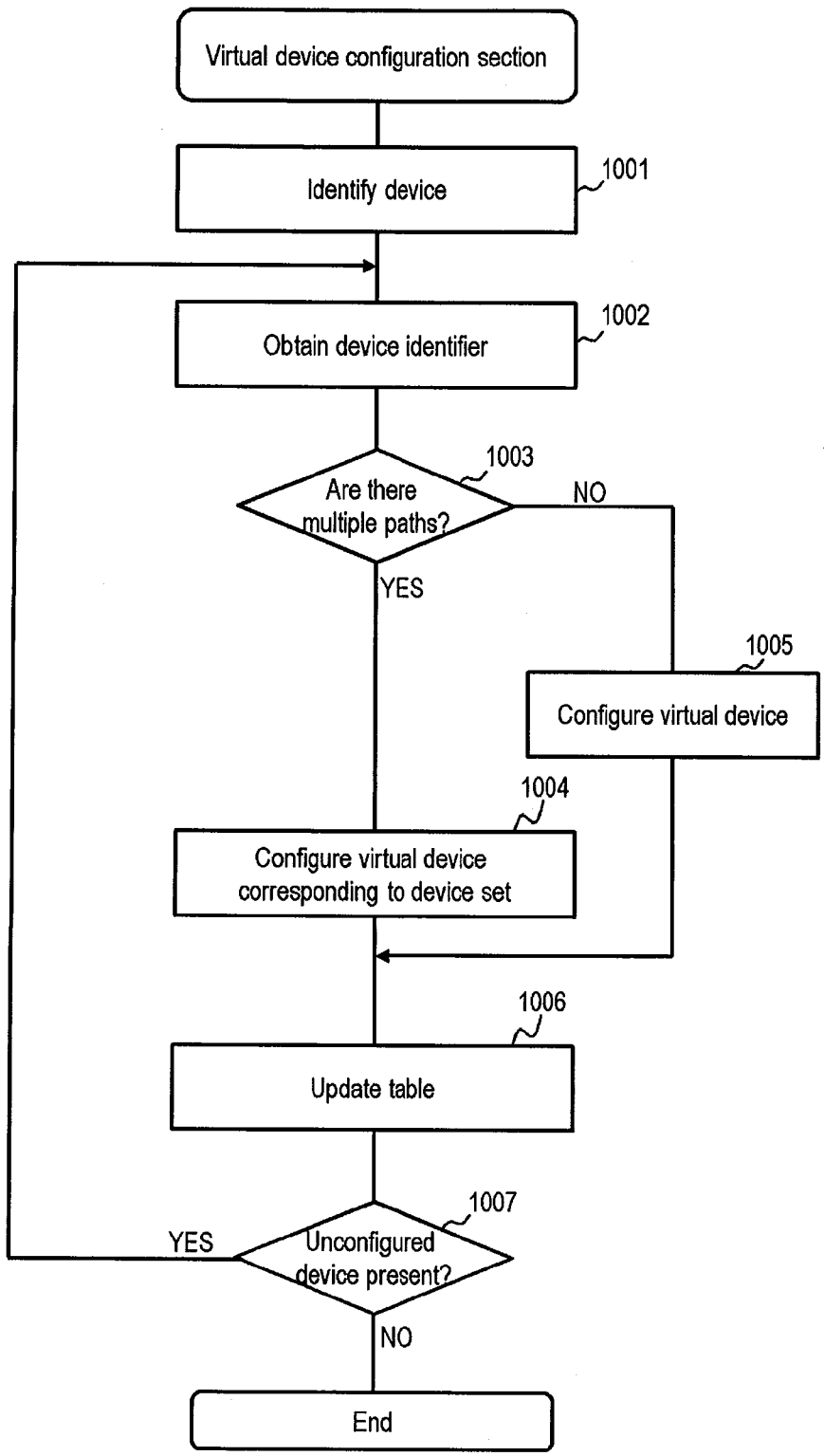
FIG. 11 is a flowchart illustrating a processing example of a virtual device configuration section in Embodiment 1.

FIG. 11 illustrates a processing flow of the virtual device configuration module 111 in the I/O control program 110 of this embodiment. At Step 1001, the virtual device configuration module 111 executes identification of a device. The identification here means identification of whether the device (911, 912, 913, 922, and 923 in FIG. 10) corresponding to the compute partition is the device (911, 912, and 913 in FIG. 10) corresponding to the volume configured by the storage control program 120 of the storage partition 102 or the device (922 and 923 in FIG. 10) directly corresponding to the storage device. Here, the virtual device configuration module 111 refers to the volume configuration table 126, for example, and identifies the device corresponding to the volume configured by the storage control program 120 of the storage partition 102 on the basis of the identifier of the logical volume in the column 703 (LUN or the like) and OS or device information recognized by the device driver 125. Subsequently, at Step 1002, the virtual device configuration module 111 obtains a storage device identifier of each device. Here, first, the virtual device configuration module 111 refers to the column 702 of the volume configuration table 126 and the columns 601 and 603 of the RAID configuration table 132 and specifies the storage device identifier to be accessed by the volume for the device (911, 912, and 913 in FIG. 10) corresponding to the volume configured by the storage control program 120. For example, the target of a volume "VOL c" in FIG. 7 is a "storage device 1" and the target "AG1" of a volume "VOL b" corresponds to an array group "AG1" in FIG. 6, and the device identifier is "storage device 3, 4". Subsequently, the virtual device configuration module 111 obtains a storage device identifier of the device for the device (922 and 923 in FIG. 10) directly corresponding to the storage device. As a method of obtaining, the identifier is obtained via a device driver, OS, and firmware such as BIOS and EFI, for example.

At Step 1003, the virtual device configuration module 111 determines whether there is a set of devices corresponding to the same storage device in the multiple paths. Here, the virtual device configuration module 111 obtains a set of devices whose storage device identifiers obtained at Step 1002 match between the device (911, 912, and 913 in FIG. 10) corresponding to the volume configured by the storage control program 120 and the device (922 and 923 in FIG. 10) directly corresponding to the storage device. In the example in FIG. 10, the sets of the devices 912 and 922 and the devices 913 and 923 are applicable. If there is a set of the devices, the routine proceeds to Step 1004 and if not, the virtual device configuration module 111 moves to Step 1005. At Step 1004, the virtual device configuration module 111 configures a virtual device. Here, the virtual device configuration module 111 configures a virtual device corresponding to the set of the devices obtained at Step 1003. In the example in FIG. 10, the virtual device 910 is configured to the set of the devices 912 and 922 and the virtual device 920 is configured to the set of devices 913 and 923. At Step 1005, the virtual device configuration module 111 configures the virtual device corresponding to the applicable device. In FIG. 10, the virtual device 930 corresponding to the device 911 is configured. However, the configuration of the virtual device at this step is not indispensable and the OS/application 150 may directly use the device 911.

At Step 1006, the virtual device configuration module 111 updates the virtual device configuration table 133. Here, the identifier of the configured virtual device is entered in the column 902, and if the virtual device is configured at Step 1004, "Yes" is entered in the column 903, while if the virtual device is configured at Step 1005, "None" is entered in the column 903. Moreover, for the columns 904 and 905, it is assumed that a path according to default setting arbitrarily configured by a user or the like is selected. In the column 906, the RAID level/configuration is registered. If the RAID is configured for the target device of the virtual device created at Step 1004 and Step 1005, the RAID level and configuration are registered therein, while if not, "Raw" is registered. The case where the RAID has been configured is that the target (column 702) of the volume configuration table 126 to the applicable device at Step 1001 is the array group ("AG1" or the like). At Step 1007, if there is an unconfigured device for which the corresponding virtual device is not configured for the device detected at Step 1001, the virtual device configuration module 111 moves to Step 1002.

Figure 12:
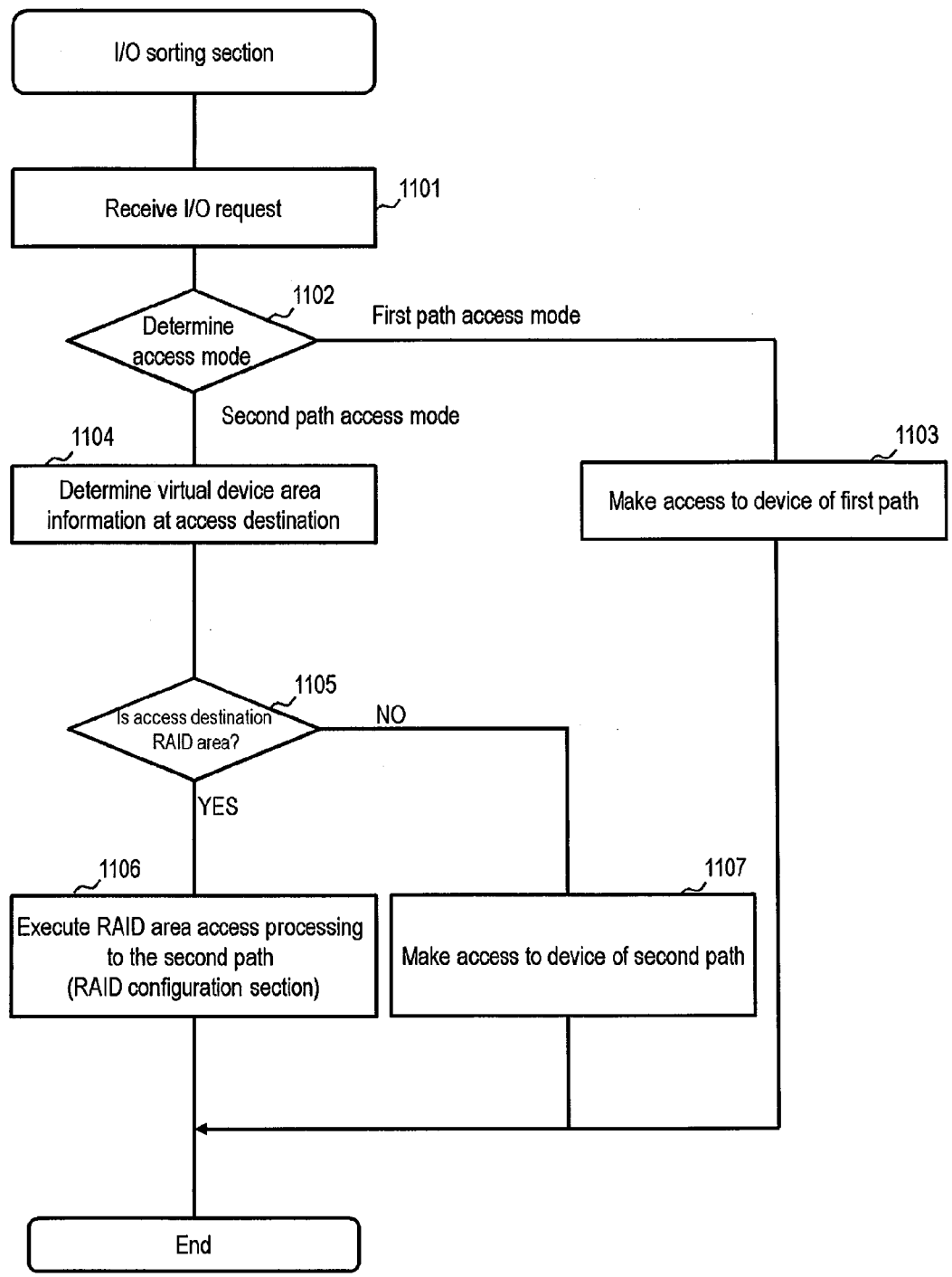
FIG. 12 is a flowchart illustrating a processing example of an I/O sorting section in Embodiment 1.

FIG. 12 illustrates a processing flow of the I/O sorting module 113 in this embodiment. At Step 1101, the I/O sorting module 113 receives an I/O request to the virtual device from the OS/application 150. At Step 1102, the I/O sorting module 113 determines an access mode to the applicable virtual device. Here, the I/O sorting module 113 refers to the virtual device configuration table 133 and if the mode of the applicable virtual device (column 904 in FIG. 9) is the "first path", the routine goes to Step 1103, while if it is the "second path", the routine goes to Step 1104. The determination may be made from the identifier of a transmission destination by referring to the column 905. At Step 1103, the I/O sorting module 113 sorts the I/O access to the device of the first path corresponding to the applicable virtual device. Here, the device of the first path is a device (devices 912 and 913 in FIG. 10) corresponding to the volume configured by the storage control program 120 of the storage partition 102. At Step 1104, the I/O sorting module 113 obtains whether or not the device corresponding to the virtual device at the access destination configures the RAID. This indicates a case where the column 906 to the applicable virtual device of the applicable host in the virtual device configuration table 133 is not "Raw".

Regarding the access mode to the virtual device, such a case is expected that a user selects an access path of data in accordance with a use case using the data of the system in introduction of the system. The "first path" is selected if the user wants to use functions provided in the storage control program 120. The functions here mainly include snapshot, backup, disaster recovery, thin provisioning, data migration, virtualization of storage tiers and the like. On the other hand, the "second path" is selected if the user wants to effectively bring out the data access functions without using the above-described functions.

At Step 1105, the I/O sorting module 113 moves to Step 1106 if the RAID is configured or to Step 1107 if not on the basis of the information obtained at Step 1104. At Step 1106, the I/O sorting module 113 executes RAID area access processing by the RAID configuration module 123 for the device of the second path corresponding to the applicable virtual device. Here, the device of the second path is a device directly corresponding to the storage device. In the RAID area access processing, the processing such as conversion of the I/O access request to the physical address and the logical address of the storage device, appropriate partitioning/integration of the access processing to the target device, parity calculation and writing in the device during writing access and the like on the basis of the RAID level/configuration indicated by the column 906 of the applicable virtual device of the applicable host in the virtual device configuration table 133. As a result, reading/writing with respect to the device in which the RAID is configured is realized. At Step 1107, the I/O sorting module 113 sorts the I/O access request to the device of the second path corresponding to the applicable virtual device.

Figure 13:
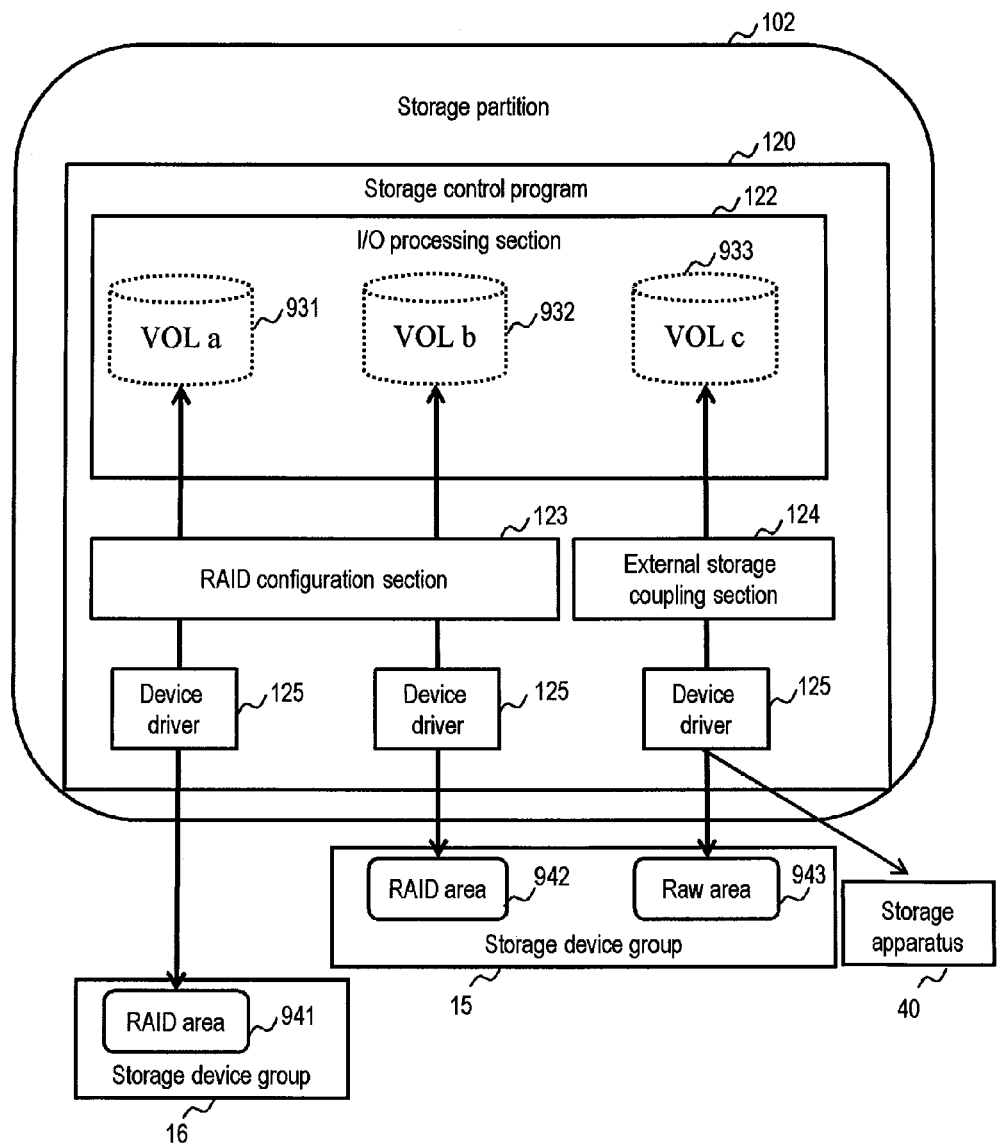
FIG. 13 is a diagram schematically illustrating a logical configuration example of the storage control program in Embodiment 1.

FIG. 13 illustrates a logical block configuration of the storage control program 120 in this embodiment. An access is made to the storage device (941 and 942 in the figure) in which the RAID is configured via the device driver 125 corresponding to each of the storage device groups 15 and 16 via the RAID configuration module 123, and in the case of the Raw-accessed storage device (943 in the figure) or the external storage apparatus (storage apparatus 40 in the figure), an access is made via the External storage connecting module 124.

The Raw-accessed VOL C (933) is the Raw area 943 on the storage device and has no RAID configuration. Thus, if an access is made to the Raw area 943 through the RAID configuration module 123, data cannot be recognized correctly. Thus, if an access is to be made to the Raw area 943, as in this figure, the access is made via the External storage connecting module 124 so that the Raw area 943 can be used while using the storage partition 102.

Figure 14:
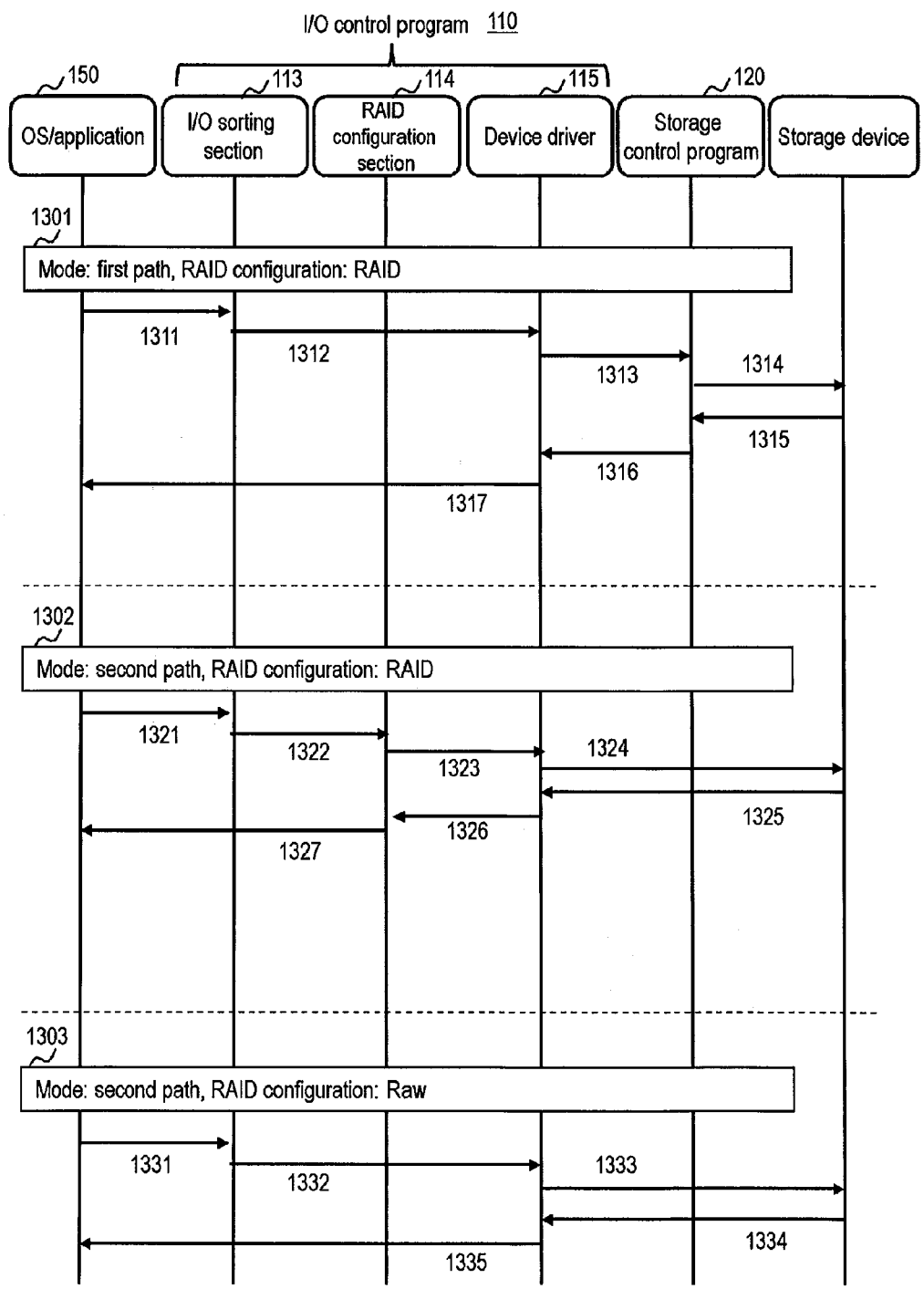
FIG. 14 is a sequence diagram of I/O processing in Embodiment 1.

FIG. 14 illustrates a sequence of an I/O access in this embodiment. If the mode of the target virtual device of the I/O request from the OS/application 150 is the "first path" and the RAID configuration is "RAID" (1301 in the figure), an access is made to the storage device via the storage control program 120. On the other hand, if the mode of the target virtual device of the I/O request is the "second path" and the RAID configuration is "RAID" (1302 in the figure), an access is made to the storage device not via the storage control program 120 but via the RAID configuration module 114 of the I/O control program 110. Moreover, if the mode of the target virtual device of the I/O request is the "second path" and the RAID configuration is "Raw" (1303 in the figure), an access is made to the storage device not via the storage control program 120 or the RAID configuration module 114. As a result, the I/O access performance becomes high speed in order from 1301, 1302, and 1303, while 1301 is provided with functions of the storage control program 120 and 1301 and 1302 are provided with the functionality of the RAID.

Figure 15:
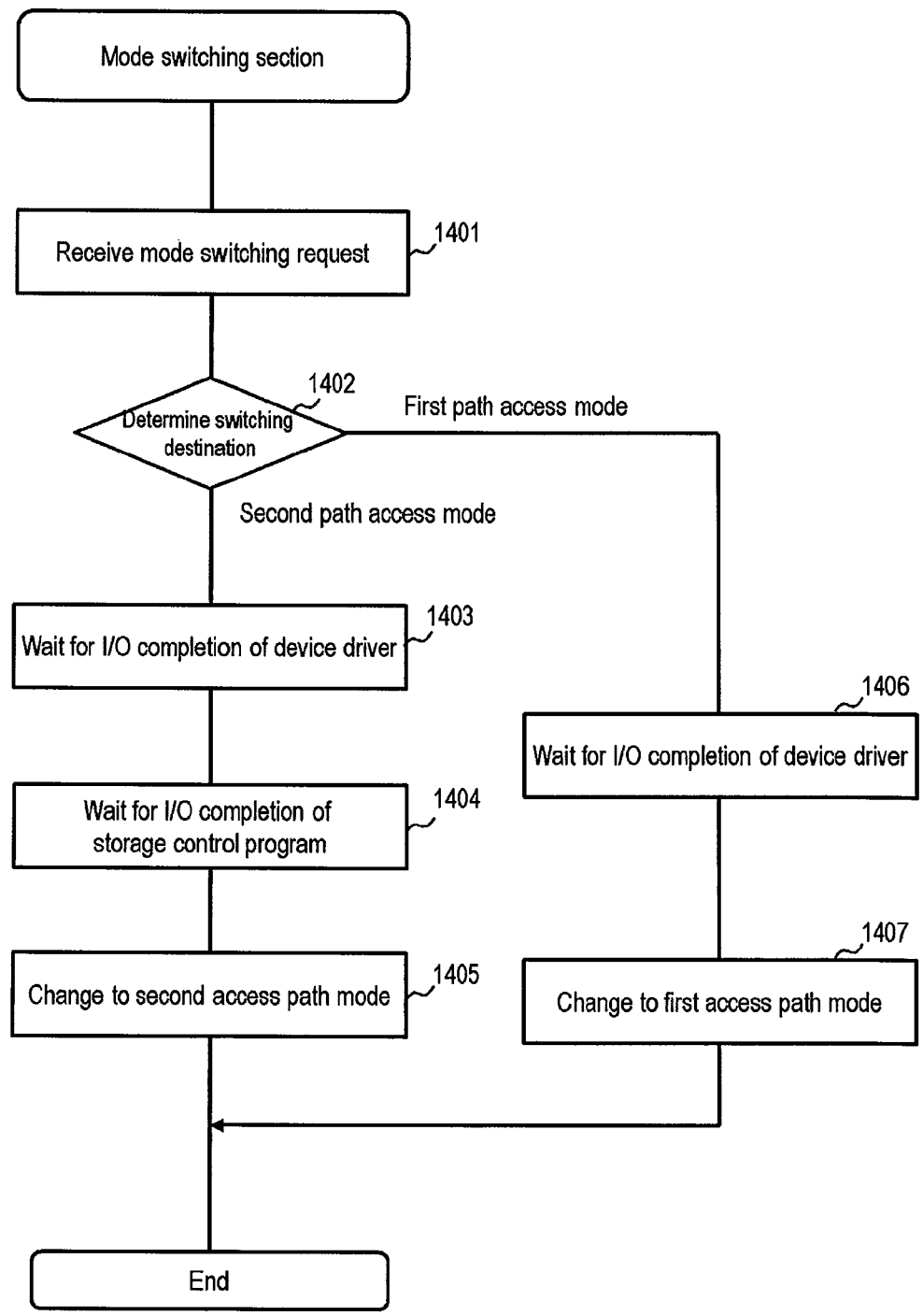
FIG. 15 is a flowchart illustrating a processing example of a mode switching section in Embodiment 1.

FIG. 15 illustrates a processing flow of the mode switching module 112 of this embodiment. At Step 1401, the mode switching module 112 receives a mode switching request. Regarding the mode switching request, the mode switching module 112 is provided with an interface (GUI, API and the like) to a user or an application, for example, and receives the request from the interface. The received contents are a virtual device as a target of the mode switching and a type of the mode at the switching destination. At Step 1402, the mode switching module 112 moves to Step 1403 if the received request is switching to an access mode to the second path or moves to Step 1406 if it is switching to the first path. If the virtual device configuration table 133 is referred to and the mode of the virtual device is already the same as the mode at the switching destination, processing of the mode switching module 112 is finished.

At Step 1403, the mode switching module 112 waits for I/O completion of the device driver 115 in the compute partition 101. Subsequently, at Step 1404, the mode switching module 112 waits for execution completion of the I/O request to the volume corresponding to the applicable virtual device in the storage control program 120. Here, a completion notice is made by the storage control program 120 and the mode switching module 112 via an information exchange interface or the like. At Step 1405, the mode switching module 112 changes the mode of the applicable virtual device of the virtual device configuration table 133 to the second path. On the other hand, at Step 1406, the mode switching module 112 waits for I/O completion of the device driver 115 in the compute partition 101. Subsequently, at Step 1407, the mode switching module 112 changes the mode of the applicable virtual device of the virtual device configuration table 133 to the first path.

The switching of the access mode may be dynamically changed by a discrimination program to be provided in the I/O control program 110. In this case, the I/O control program 110 collects performance information from access frequency from the OS/application 150 to the virtual device, OS/application 150, the file system, the driver or the storage control program 120 and detects portions which become I/O queues or I/O processing necks. As a result, switching is made from the first path to the second path for data with I/O access frequency higher than a predetermined threshold value or data in which waiting for I/O processing occurs more frequently than the others in the OS/application 150, the file system, and the driver. On the other hand, switching is made from the second path to the first path for the data with I/O access frequency lower than the predetermined threshold value or data in which waiting for I/O processing occurs less frequently than the others. As a result, the access path can be optimized in accordance with data and higher performance improvement can be realized.

Moreover, the I/O control program 110 provides a user with GUI specifying a threshold value for performing the above-described path switching through the management computer 30. Specific examples of the threshold value include a threshold value as an index for determining the above-described I/O queue or I/O processing neck and a threshold value of I/O access frequency.

The method of using the RAID area 941 and the Raw area 943 separately has been described for the storage device groups 15 and 16. Subsequently, a method of moving the data stored in the RAID area 941 and the Raw area 943 to another area by means of data migration and not only presence of use of the storage control program 120 but of further using the RAID area 941 and the Raw area 943 separately in accordance with use applications of the data will be described by using FIGS. 16 and 17.

For example, such a case is expected that data of processing with high importance placed on data protection such as online transaction processing and significant processing such as a core system is stored in the RAID area 941 and the data is moved from the RAID area 941 to the Raw area 943 if a part of the data is used so as to execute data analysis processing or the like. As a result, a more flexible system according to the use application of the data can be provided to a user.

Here, if the data is migrated from the RAID area 941 to the Raw area 943 in the migration, there is a problem that processing of the system cannot be stopped for the data migration. In a method described in FIGS. 16 and 17, in the I/O control program 110, the data temporarily held in a device for migration is selected as an access path so that the data is migrated without a stop and the above-described problem can be also solved.

Figure 16:
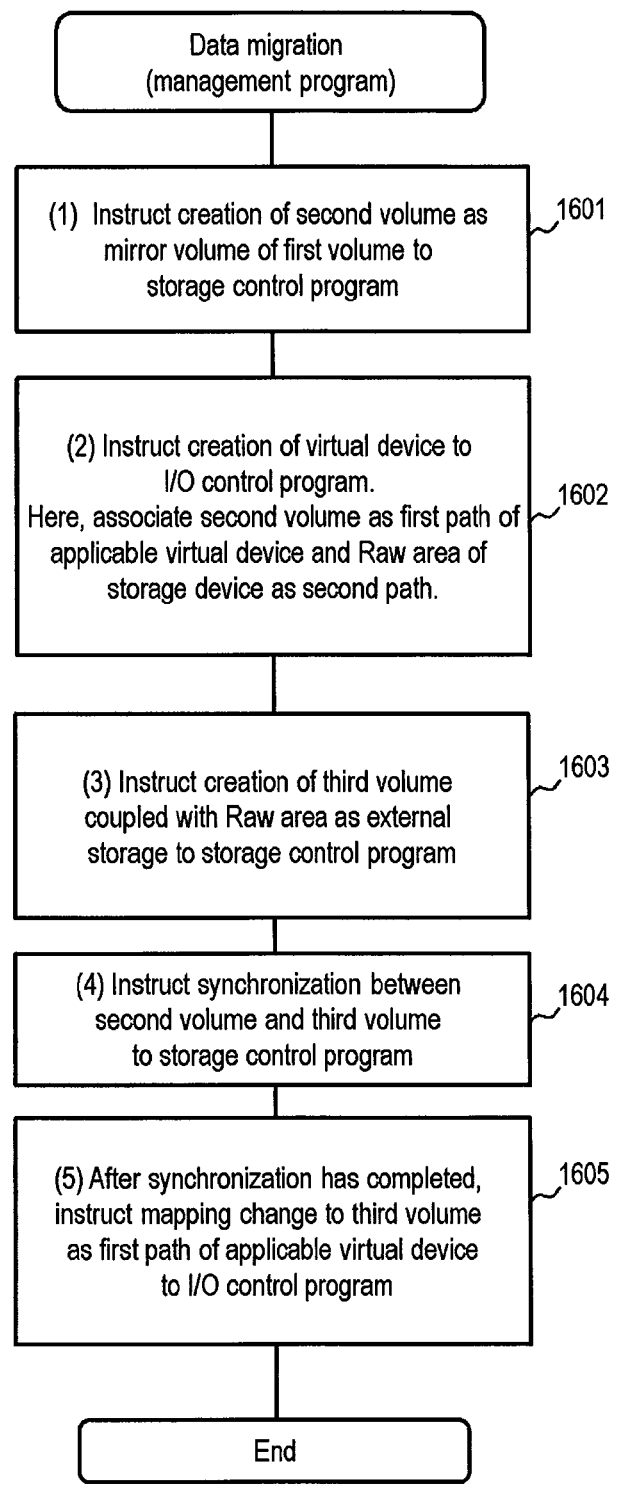
FIG. 16 is a flowchart illustrating a data migration processing example in Embodiment 1.

FIG. 16 is a processing flow in which data migration processing is executed in the management program 35 in this embodiment. At Step 1601, the management program 35 (1) instructs the storage control program 120 to create a second volume as a mirror volume of a first volume, and at Step 1602, the management program 35 (2) instructs the I/O control program 110 to create a virtual device. Here, the second volume is associated as a first path of the virtual device and the Raw area 943 of the storage device as a second path. At Step 1603, the management program 35 (3) instructs the storage control program 120 to create a third volume coupled to the Raw area 943 as an external storage. At Step 1604, the management program 35 (4) instructs the storage control program 120 to synchronize the second volume with the third volume. At Step 1605, the management program 35 (5) instructs the I/O control program 110 to change mapping to the third volume as the first path of the applicable virtual device after synchronization at Step 1604 is completed. As a result, the contents stored in the existing first volume can be migrated to a state capable of being accessed from the second path while capable of being accessed in the compute partition 101.

Figure 17:
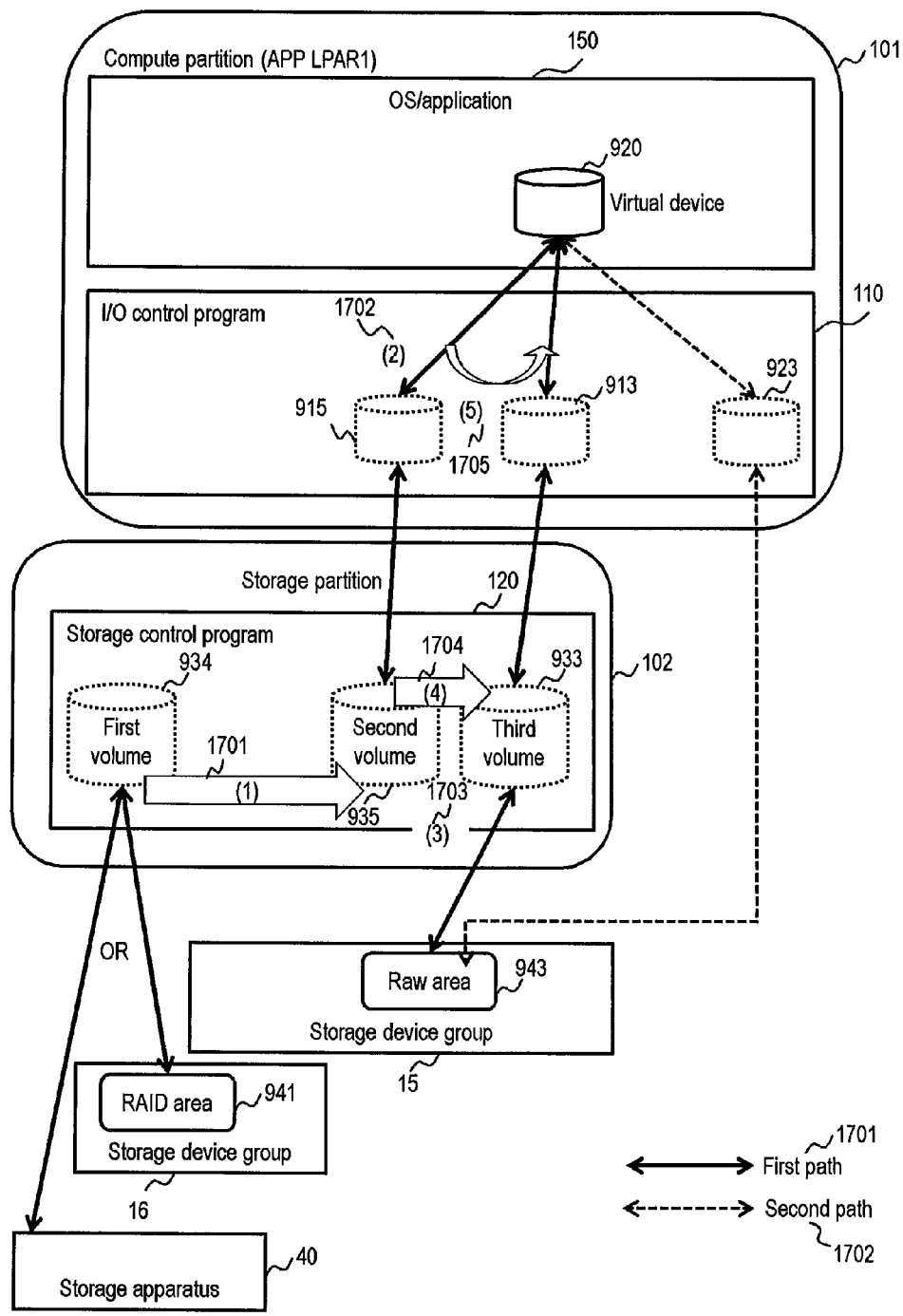
FIG. 17 is a diagram schematically illustrating the data migration processing in Embodiment 1.

FIG. 17 is a block diagram of the data migration processing illustrated in FIG. 16. Here, the first volume may be a volume corresponding to the external storage apparatus 40. Reference numeral 1701 in the figure corresponds to Step 1601 in FIG. 16, 1702 to Step 1602, 1703 to Step 1604, 1704 to Step 1604, and 1705 to Step 1605.

Moreover, the data migration from the Raw area 943 to the RAID area 941 can be also realized by the similar method.

Though not shown, the above-described system and apparatus are provided with configurations required for executing processing as an information processing device such as input/output devices represented by a display and a keyboard, for example, and processing at each section is executed by the respective hardware in connection. Moreover, each processing can be realized by hardware by a processing section for executing that by forming an integrated circuit or the like. The same also applies to an embodiment below.

Embodiment 2

Embodiment 2 is a system in which a node is separated to each of a logical partition which is a compute partition and a logical partition which is a storage partition without using logical partitioning and is realized by separate computers, and similarly to Embodiment 1, a computer system capable of flexible use according to user needs for the case where high-speed access is desired to a storage device and a case where data protection is desired will be described.

Figure 18:
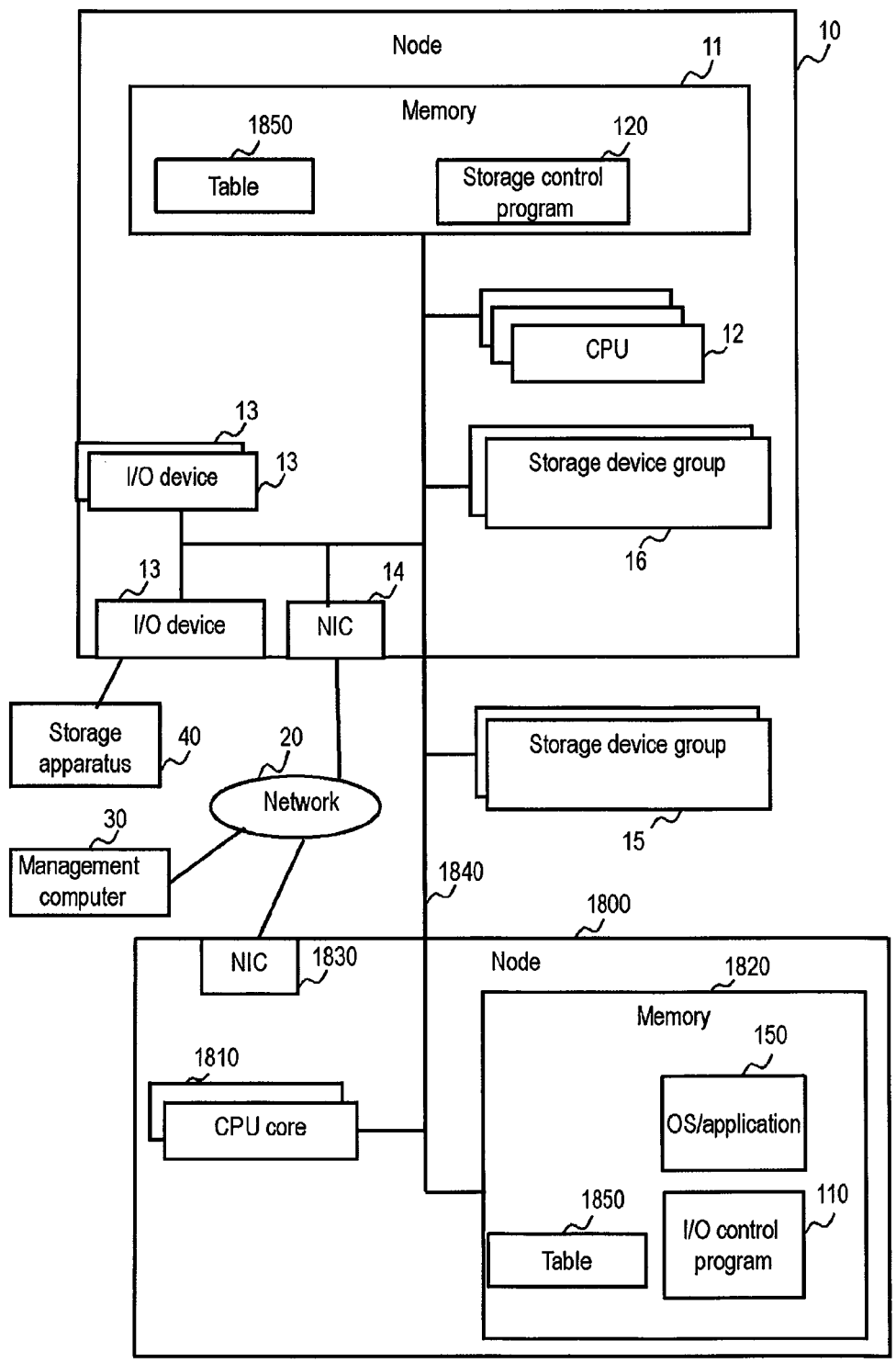
FIG. 18 is a block diagram for explaining a configuration example of a computer system in Embodiment 2.

FIG. 18 is a block diagram illustrating a configuration example of a second embodiment of the present invention. What is different from Embodiment 1 is that the storage device group 15 is shared by a plurality of the nodes 10 and 1800 through a shared bus 1840 between the nodes and that the node 10 holds the storage control program 120, the OS/application 150 and the I/O control program 110 for the node 1800, and a table 1850 equivalent to the shared table 130 in Embodiment 1 in each table. The table 1850 synchronizes contents through the network 20 between the nodes and the shared bus 1840. Here, the node 1800 corresponds to the compute partition 101 in Embodiment 1.

As a result, by separating the resources between the OS/application 150 and the storage control program 120, interference of the resources can be eliminated.

The above-described Embodiment was explained such that the I/O control program 110 has the I/O sorting means but it may be so configured that a program for realizing the I/O sorting means and related information may be introduced into a computer. Moreover, the program for realizing the I/O sorting means may be stored in a storage device in the computer or an external storage apparatus in advance or may be introduced into the external storage apparatus when necessary through a detachable storage medium or a communication medium (network of wired, wireless, optical and the like or by means of a carrier wave or a digital signal on the network).

REFERENCE SIGNS LIST

10 node
11 memory
12 CPU
13 I/O device
14 NIC
15, 16 storage device group

The invention claimed is:

1. A computer system comprising:
    a CPU and storage devices providing RAID (Redundant Array of Inexpensive Disks) areas, in which data is stored with RAID configuration and Raw areas, which are accessed directly and in which data is stored without RAID configurations,
    wherein the CPU is configured to:
    provide at least a first logical partition and a second logical partition by partitioning physical resources including the CPU and the storage devices,
    wherein CPU resources allocated to the first logical partition are configured to:
    provide one or more virtual devices to an application,
    receive a first I/O (input/output) request from the application and access the Raw area based on the first I/O request,
    receive a second I/O request form the application and transmit a request to the second logical partition based on the second I/O request,
    wherein the CPU resources allocated to the second logical partition control access to the RAID area with RAID control function.

2. The computer system according to claim 1,
    wherein the CPU resources allocated to the second logical partition access the RAID area by converting a logical block address of the second I/O request to a physical block address.

3. The computer system according to claim 1,
    wherein the CPU resources allocated to the first logical partition further perform RAID control function, and wherein the CPU resources allocated to the first logical partition are further configured to:
receive a third I/O request from the application, and access the RAID areas based on the third I/O request with the RAID control function.

4. The computer system according to claim 1, wherein the CPU resources allocated to the second logical partition further control access to the Raw area without RAID control function.

5. The computer system according to claim 3, wherein the CPU allocated to the first logical partition is further configured to determine whether to access a storage device, which is a target of an I/O request directly or via the second logical partition.

6. The computer system according to claim 5, wherein the CPU resources allocated to the first logical partition determine whether to access the storage device directly or via the second logical partition based on an I/O access frequency of data indicated by the I/O request.

7. The computer system according to claim 1, wherein the CPU resources allocated to the second logical partition provide a plurality of volumes providing RAID areas, and wherein each of the virtual devices correlate to at least one of the volumes.

8. The computer system according to claim 7, wherein at least one path which is coupled to either the RAID areas or the Raw areas are set to each of the virtual devices.

9. The computer system according to claim 1, wherein the storage devices includes a first storage medium and a second storage medium, which operates at a speed lower than that of the first storage medium,
the first storage medium includes the RAID area and the Raw area, and
the second storage medium includes the RAID area and does not include the Raw area.

10. The computer system according to claim 1, further comprising a memory,
wherein the memory stores a common table which is used by both of the first logical partition and the second logical partition.

11. An I/O (input/output) request processing method of a computer system, the computer system comprising a CPU and storage devices providing RAID (Redundant Array of Inexpensive Disks) areas, in which data is stored with RAID configuration, and Raw areas, which are accessed directly and in which data is stored without RAID configurations, the CPU provides a provide at least a first logical partition and a second logical partition by partitioning physical resources including the CPU and the storage devices, the method comprising:
steps performed by the CPU resources allocated to the first logical partition of:
providing one or more virtual devices to an application;
receiving a first I/O (input/output) request from the application and access the Raw area based on the first I/O request;
receiving a second I/O request form the application and transmit a request to the second logical partition based on the second I/O request; and
a step performed by the CPU resources allocated to the second logical partition of controlling access to the RAID area with RAID control function.

12. The I/O request processing method of a computer system according to claim 11, further comprising the step, performed by the CPU resources allocated to the second logical partition, of accessing the RAID area by converting a logical block address of the second I/O request to a physical block address.

13. The I/O request processing method of a computer system according to claim 11, wherein
the CPU resources allocated to the first logical partition further perform RAID control function, and
wherein the CPU resources allocated to the first logical partition further performs the steps of:
receiving a third I/O request from the application; and
accessing the RAID areas based on the third I/O request with the RAID control function.

14. The I/O request processing method of a computer system according to claim 11, further comprising the step, performed by the CPU resources allocated to the second logical partition, of controlling access to the Raw area without RAID control function.

15. The I/O request processing method of a computer system according to claim 13, further comprising the step, performed by the CPU allocated to the first logical partition, of determining whether to access a storage device, which is a target of an I/O request directly or via the second logical partition.

16. The I/O request processing method of a computer system according to claim 15, wherein
the CPU resources allocated to the first logical partition determine whether to access the storage device directly or via the second logical partition based on an I/O access frequency of data indicated by the I/O request.

17. The I/O request processing method of a computer system according to claim 11, wherein
the CPU resources allocated to the second logical partition provide a plurality of volumes providing RAID areas, and wherein each of the virtual devices correlate to at least one of the volumes.

18. The I/O request processing method of a computer system according to claim 17, wherein at least one path which is coupled to either the RAID areas or the Raw areas are set to each of the virtual devices.

19. The I/O request processing method of a computer system according to claim 11,
wherein the storage devices includes a first storage medium and a second storage medium, which operates at a speed lower than that of the first storage medium,
the first storage medium includes the RAID area and the Raw area, and
the second storage medium includes the RAID area and does not include the Raw area.

20. The I/O request processing method of a computer system according to claim 11, further comprising a memory,
wherein the memory stores a common table which is used by both of the first logical partition and the second logical partition.

* * * * *